United States Patent [19]
Zwiener et al.

[11] Patent Number: 5,412,056
[45] Date of Patent: May 2, 1995

[54] SURFACE COATINGS AND A PROCESS FOR THEIR PRODUCTION

[75] Inventors: Christian Zwiener, Köln; Michael Sonntag, Odenthal; Dieter Margotte, Krefeld; Pedain, Köln; Harald Blum, Wachtendonk; Volker Schneider, Wachtendonk, all of Germany

[73] Assignee: Bayer Aktiengesellschaft, Leverkusen, Germany

[21] Appl. No.: 286,612

[22] Filed: Aug. 5, 1994

[30] Foreign Application Priority Data

Aug. 19, 1993 [DE] Germany .................. 43 27 853.1

[51] Int. Cl.$^6$ .................................................. C08G 18/34
[52] U.S. Cl. ........................................... 528/73; 528/84
[58] Field of Search ................................. 528/73, 84

[56] References Cited

U.S. PATENT DOCUMENTS

| | | | |
|---|---|---|---|
| 3,661,923 | 5/1972 | Emmons et al. | 260/307 F |
| 3,743,626 | 7/1973 | Emmons | 260/77.5 AQ |
| 3,912,691 | 10/1975 | Emmons | 260/77.5 MA |
| 4,024,117 | 5/1977 | Emmons | 260/78.3 R |
| 4,032,686 | 6/1977 | Emmons | 428/425 |
| 4,101,527 | 7/1978 | Cunningham et al. | 528/73 |
| 4,118,376 | 10/1978 | Pedain et al. | 528/59 |
| 4,138,545 | 2/1979 | Emmons et al. | 528/289 |
| 4,471,102 | 9/1984 | Petschke | 528/49 |
| 5,126,170 | 6/1992 | Zwiener et al. | 427/385.5 |
| 5,157,100 | 10/1992 | Badjak et al. | 528/73 |
| 5,214,086 | 5/1993 | Mormile et al. | 524/237 |
| 5,236,741 | 8/1993 | Zwiener et al. | 427/385.5 |
| 5,243,012 | 9/1993 | Wicks et al. | 528/58 |

Primary Examiner—Morton Foelak
Assistant Examiner—R. F. Johnson
Attorney, Agent, or Firm—Joseph C. Gil; Thomas W. Roy

[57] ABSTRACT

A coating composition in which the binding agent is a two-component system containing a) a polyisocyanate component and b) an isocyanate-reactive component and contains b1) specific ester group-containing secondary polyamines, b2) specific moisture-activatable blocked polyamines and b3) optionally other known compounds containing isocyanate-reactive groups, and a process for preparing coated substrates from this coating composition.

21 Claims, No Drawings

SURFACE COATINGS AND A PROCESS FOR THEIR PRODUCTION

BACKGROUND OF THE INVENTION

1. Field of the Invention

The present invention relates to a novel surface coatings in which the binder is a two-component system containing a polyisocyanate component and a specific component containing isocyanate-reactive groups, and to their use for the production of coatings on any desired substrate.

2. Description of the Prior Art

Two-component coating compositions that contain as binding agent a polyisocyanate component in combination with an isocyanate-reactive component, especially a polyhydroxyl component, are known. They are suitable for the production of high-grade surface coatings that can be adjusted to be hard, resilient, abrasion- and solvent-resistant and, above all, also weather resistant.

In accordance with the present invention novel two-component coating compositions are used in which the binding agent is based on a two-component system containing a polyisocyanate component and an isocyanate-reactive component, which is composed entirely or partly of a mixture of specific secondary polyamines and oxazolidines described in more detail hereinafter.

The secondary polyamines are polyaspartic acid esters such as those described in EP-A-0,403,921. These secondary amines, in combination with polyisocyanates, are especially suited as binding agents in coating compositions containing few or no solvents and allow the coatings to be cured rapidly at low temperatures.

The use of oxazolidines with polyisocyanates as moisture-hardening reactive systems for coatings, adhesives and other applications is also known and is described, for example, in U.S. Pat. Nos. 3,661,923, 3,743,626, 3,912,691, 4,024,117, 4,032,686, 4,101,527, 4,118,376, 4,138,545 and 4,471,102.

In EP-A-0,531,249, novel coating compositions that dry at ambient temperature are described. These compositions contain mixtures of hydroxy-functional resins with isocyanates and aldimines or ketimines. The compositions may also contain reactive diluents consisting of secondary amines, alcohols or oxazolidines.

It is known, however, that coating formulations that contain ketimines or aldimines turn yellow to a marked extent both in the form of the liquid coating composition and in cured form and, thus, are consequently less suitable for finishing coatings of the highest quality. The same applies also to coating formulations that contain ketimines or aldimines and polyaspartic acid esters.

Although coating systems with oxazolidines exhibit similar yellowing phenomena, it has surprisingly been found that, even after drying at low temperatures, surface coatings having outstanding properties, especially a lesser tendency to turn yellow and very good resistance to solvents, can be obtained when they are produced using two-component coating compositions in which the binder is based on a polyisocyanate component and an isocyanate-reactive component containing entirely or partly a mixture of polyaspartic acid esters and oxazolidines.

SUMMARY OF THE INVENTION

The present invention relates to a coating composition in which the binder is a two-component system containing a) a polyisocyanate component and
b) an isocyanate-reactive component containing a mixture of
b1) compounds corresponding to formula I

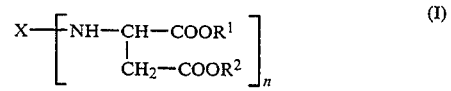

b2) compounds having a number average molecular weight of 73 to 10,000 and containing at least one structural unit per molecule corresponding to formula II

and optionally
b3) other compounds containing isocyanate-reactive groups,
wherein
X represents an n-valent radical which is inert towards isocyanate groups and is obtained by removing the primary amino groups from a polyamine having (cyclo)aliphatically bound amino groups and a molecular weight of 60 to 6,000,
$R^1$ and $R^2$ may be the same or different and represent alkyl radicals having 1 to 18 carbon atoms,
n is an integer of at least 2, and
m is 0, or 1.

The present invention is also directed to a process for the preparation of coated substrates using the previously described coating composition.

DETAILED DESCRIPTION OF THE INVENTION

In principle, any polyisocyanate known from polyurethane chemistry is suitable as polyisocyanate component a) for the process according to the invention. Examples include polyisocyanates having a molecular weight of 168 to 300, such as hexamethylene diisocyanate, 2,2,4- and/or 2,4,4-trimethylhexamethylene diisocyanate, dodecamethylene diisocyanate, 1,4-diisocyanatocyclohexane, 1-isocyanato-3,3,5-trimethyl-5-isocyanatomethylcyclohexane (IPDI), 2,4'- and/or 4,4'-diisocyanatodicyclohexylmethane, 2,4'- and/or 4,4'-diisocyanatodiphenylmethane, mixtures of these isomers with their higher homologs, which may be obtained in a known manner by the phosgenation of aniline/formaldehyde condensates, 2,4- and/or 2,6-diisocyanatotoluene and mixtures of these polyisocyanates.

It is preferred to use the known derivatives or adducts of those monomeric polyisocyanates. Examples include biuret-group-containing polyisocyanates, such as those described, for example, in U.S. Pat. No. 3,124,605, U.S. Pat. No. 3,201,372 or DE-OS 1,101,394; isocyanurate-group-containing polyisocyanates, such as those described, for example, in U.S. Pat. No. 3,001,973, DE-PS 1,022,789, 1,222,067 and 1,027,394 and in DE-OS 1,929,034 and 2,004,048; urethane-group-containing polyisocyanates, such as those described, for example, in DE-OS 953,012, BE-PS 752,261 or U.S. Pat. Nos. 3,394,164 and 3,644,457; carbodiimide group-containing polyisocyanates, such as those described in DE-PS 1,092,007, U.S. Pat. No. 3,152,162 and DE-OS 2,504,400, 2,537,685 and 2,552,350; allophanate group-containing polyisocyanates, such as those described, for example, in GB-PS 994,890, BE-PS 761,626 and NL-OS 7,102,524; and uretdione group-containing polyisocyanates, such as those described in EP-A 0,377,177.

Especially preferred modified polyisocyanates include N,N',N"-tris(6-isocyanato-hexyl)biuret and mixtures thereof with its higher homologs, and N,N',N"-tris(6-isocyanatohexyl)isocyanurate or mixtures thereof with its higher homologs containing more than one isocyanurate ring.

Isocyanate-group-containing prepolymers and semi-prepolymers prepared from the previously described monomeric or modified polyisocyanates and organic polyhydroxyl compounds are also preferably used as polyisocyanate component a). The prepolymers and semi-prepolymers generally have an NCO content of 0.5 to 30% by weight, preferably 1 to 20% by weight, and are prepared in known manner by reacting the starting materials while maintaining an NCO/OH equivalent ratio of 1.05:1 to 10:1, preferably 1.1:1 to 3:1. After the reaction any free volotile starting polyisocyanate may optionally be removed by distillation.

Suitable for the preparation of such prepolymers and semi-prepolymers are low molecular weight polyhydroxyl compounds having a molecular weight of 62 to 299, such as ethylene glycol, propylene glycol, trimethylolpropane and 1,6-dihydroxy-hexane; low molecular weight, hydroxyl group-containing esters of such polyols with dicarboxylic acids of the type set forth hereinafter; low molecular weight ethoxylation and/or propoxylation products of these low molecular weight polyhydroxyl compounds; and mixtures of these modified or unmodified polyhydric alcohols.

The known higher molecular weight polyhydroxyl compounds having a molecular weight, which may be calculated from the OH content and OH functionality, of 300 to 8,000, preferably 1,000 to 5,000, are preferably used for the preparation of the prepolymers and semi-prepolymers. Those polyhydroxyl compounds have at least two hydroxyl groups per molecule and generally have a hydroxyl group content of 0.5 to 17% by weight, preferably 1 to 5% by weight.

Examples of these higher molecular weight polyhydroxyl compounds include the polyester polyols prepared as described above from low molecular weight alcohols polybasic carboxylic acids such as adipic acid, sebacic acid, phthalic acid, isophthalic acid, tetrahydrophthalic acid, hexahydrophthalic acid, maleic acid, the anhydrides of these acids and mixtures of these acids and/or acid anhydrides. Hydroxyl group-containing polylactones as specified above, especially poly-ε-caprolactones, are also suitable for the preparation of the prepolymers and semi-prepolymers.

Also very suitable for the preparation of the isocyanate group-containing prepolymers and semi-prepolymers are the polyether polyols specified above that may be obtained in known manner by the alkoxylation of suitable starter molecules. Suitable starter molecules include the previously described monomeric polyols, water, organic polyamines having at least two N—H bonds and/or mixtures thereof. Preferred alkylene oxides for the alkoxylation reaction are ethylene oxide and/or propylene oxide, which may be used in the alkoxylation reaction in any desired sequence or, alternatively, in admixture.

Also suitable for the preparation of the prepolymers and semi-prepolymers are the hydroxyl group-containing polycarbonates described above, which may be prepared, for example, by reacting the previously mentioned simple diols with phosgene or diaryl carbonates, for example, diphenyl carbonates.

Component b 1) includes compounds corresponding to formula I

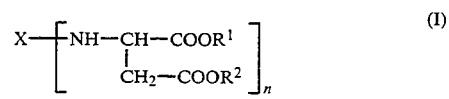

wherein
X represents an n-valent radical which is inert towards isocyanate groups and is obtained by removing the primary amino groups from a polyamine having (cyclo)aliphatically bound amino groups and a molecular weight of 60 to 6,000, preferably 88 to 322,
$R^1$ and $R^2$ may be the same or different and represent alkyl radicals having 1 to 18, preferably I to 8 and more preferably 1 to 4 carbon atoms and
n is an integer of at least 2.

Compounds of formula I (also referred to as polyaspartic acid esters) wherein n represents 2 are especially preferred. Preferred polyaspartic acid esters are those compounds wherein X represents a divalent hydrocarbon radical obtained by removing the amino groups from 1-amino-3,3,5-trimethyl-5-aminomethylcyclohexane, 4,4'-diaminodicyclohexylmethane, 3,3'-dimethyl-4,4'-diamino-dicyclohexylmethane, hexahydro-2,4- and/or-2,6-diaminotoluene, the isomers of monomethyldiaminodicyclohexylmethane and 3(4)-aminomethyl-1-methyl-cyclohexylamine.

Preferred starting components b1) otherwise include those of the formula I wherein $R^1$ and $R^2$ represent a methyl, ethyl, n-butyl or 2-ethylhexyl group.

The starting compounds b1) are prepared in a known manner by reacting primary polyamines corresponding to the formula

with maleic or fumaric acid esters corresponding to the formula

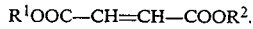

Suitable polyamines include ethylenediamine, 1,2-diaminopropane, 1,4-diaminobutane, 1,6-diaminohexane, 2,5-diamino-2,5-dimethylhexane, 2,2,4- and/or 2,4,4-trimethyl-1,6-diaminohexane, 1,11-diaminoundecane, 1,12-diaminododecane, 1-amino-3,3,5-trimethyl-5-aminomethylcyclohexane, 2,4- and/or 2,6-hexahydro-toluoylenediamine, other alkyl-substituted cyclohexanediamines, such as isopropyl-2,4- and/or-2,6-diaminocyclohexane, 2,4'- and/or 4,4'-diaminodicyclohexylmethane, 3,3'-dimethyl-4,4'-diaminodicyclohexylmethane, the isomers of diaminodicyclohexylmethane containing a methyl group as main substituent (monomethyldiaminodicyclohexylmethane), 3(4)-aminomethyl-1-methylcyclohexylamine and also, although less preferred, higher molecular weight polyether polyamines having aliphatically bound primary amino groups, such as those available under the Jeffamine tradename from Texaco.

Maleic or fumaric acid esters suitable for the preparation of the starting components b1) include maleic acid dimethyl ester, diethyl ester, di-n- or -isopropyl ester, di-n-butyl ester, di-2-ethylhexyl ester and the corresponding fumaric acid esters.

The preparation of the "polyaspartic acid esters" b1) is conducted at a temperature of 0° to 100° C. using ratios such that there is at least one and preferably one olefinic double bond for each primary amino group. Excess starting materials may be separated by distillation after the reaction. The reaction can be carried out in the absence of solvents or alternatively in the presence of suitable solvents, such as methanol, ethanol, propanol, ethyl or butyl acetate or mixtures of these solvents.

Component b2) includes compounds that contain per molecule at least one structural unit corresponding to formula II

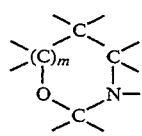 (II)

In accordance with the present invention, these compounds are also referred to as "oxazolidines." This term includes not only the corresponding 5-membered heterocyclics (m=0) but also the 6-membered compounds corresponding to those classical oxazolidines. The "oxazolidines" suitable according to the invention as component b2) have a number average molecular weight of 73 to 10,000, preferably 73 to 3,000, and more preferably 73 to 1,500. If it cannot be readily determined from the sum of the atomic weights of the individual elements, the molecular weight can be calculated, for example, from the functionality and the content of functional groups (which may be ascertained, for example, by determining the primary amino groups present after hydrolysis). In the case of higher molecular weight compounds, the number average molecular weight can also be ascertained by gel permeation chromatography using polystyrene as the standard.

Preferred oxazolidines b2) include compounds that contain 1 to 4, preferably 2 or 3 structural units corresponding to formula III per molecule

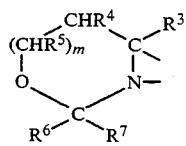 (III)

wherein $R^3$ represents hydrogen or an alkyl radical having 1 to 6 carbon atoms, $R^4$ and $R^5$ may be the same or different and represent hydrogen or alkyl radicals having 1 to 3 carbon atoms, $R^6$ and $R^7$ may be the same or different and represent hydrogen or inert organic radicals, e.g., hydrocarbon radicals having up to 8 carbon atoms, preferably alkyl radicals having 1 to 8 carbon atoms, provided that a maximum of one of the radicals $R^6$ and $R^7$ represents hydrogen; radicals $R^6$ and $R^7$, together with the carbon atom of the heterocyclic ring, may also form a 5- or 6-membered cycloaliphatic ring, and m represents 0 or 1.

Especially preferred oxazolidines suitable as component b2) are those that contain 2 or 3, preferably 2, structural units corresponding to formula IV

 (IV)

wherein $R^6$ and $R^7$ are as defined above and $R^8$ represents an alkylene radical having 2 to 6, preferably 2 or 3, carbon atoms, provided that 2 or 3 carbon atoms are arranged between the oxygen atom and the nitrogen atom.

The "oxazolidines" b2) suitable for the present invention include the bicyclic compounds according to U.S. Pat. No. 4,707,532 containing structural units of formula II, the bicyclic compounds according to U.S. Pat. No. 5,089,565 containing structural units of formula II, the bicyclic compounds according to U.S. Pat. No. 4,101,527 containing structural units of formula II and preferably the compounds according to U.S. Pat. No. 4,975,493 referred to as "oxazolanes" (the preceding U.S. patents are herein incorporated by reference).

The preferred last-mentioned compounds include especially those having a number average molecular weight of 73 to 1,500 that contain 2 or 3 structural units corresponding to formula IV per molecule, wherein $R^6$ and $R^7$ may be the same or different and represent hydrogen or alkyl groups having I to 4 carbon atoms, provided that a maximum of one of the radicals $R^8$ and $R^7$ represents hydrogen; the two radicals together with the carbon atom of the heterocyclic ring may also form a cyclohexane ring.

Most preferred as component b2) are oxazolidines corresponding to formula V

 (V)

wherein $R^6$, $R^7$ and $R^8$ are as previously defined, and $R^9$ represents hydrogen, an aliphatic hydrocarbon radical having 1 to 12, preferably I to 4, carbon atoms, a cycloaliphatic hydrocarbon radical having 5 to 10 carbon atoms or an araliphatic hydrocarbon radical having 6 to 12 carbon atoms, which may optionally also contain functional groups reactive towards isocyanate groups such as hydroxyl groups.

In all other respects the nature of the radical $R^9$ is of no significance with regard to the suitability of the compounds as component b2). If the substituents $R^9$ are hydrogen or hydrocarbon radicals containing isocyanate-reactive groups, preferably hydroxyl or amino groups, a spontaneous addition reaction takes place between the isocyanate groups and the isocyanate-reactive groups when the polyisocyanate component a) comes into contact with the oxazolidines b2), so that reaction products of components a) and b2) are formed completely or partially as intermediates.

Oxazolidines that are suitable according to the invention as component b2) and that contain more than one oxazolidine ring of the above-mentioned formulas II to IV can be obtained in known manner, for example, from monooxazolidines corresponding to formula V wherein $R^9=H$, or that contain reactive groups in the radical $R^9$.

Monooxazolidines corresponding to formula V may be prepared in known manner by reacting aldehydes or ketones corresponding to the formula

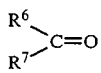

with suitable hydroxyamines of the type described in more detail hereinafter. The ketones have a molecular weight of 58 to 198, while the aldehydes have a molecular weight of 30 to 128.

Suitable aldehydes include acetaldehyde, propionaldehyde, butyraldehyde, isobutyraldehyde, trimethylacetaldehyde, 2,2-dimethylpropanal, 2-ethylhexanal, 3-cyclohexene-1-carboxaldehyde, hexanal, heptanal, octanal, valeraldehyde, benzaldehyde, tetrahydrobenzaldehyde, hexahydrobenzaldehyde, propargylaldehyde, p-toluoylaldehyde, phenylethanal, 2-methylpentanal, 3-methylpentanal, 4-methyl-pentanal and sorbaldehyde. Butyraldehyde, isobutyraldehyde, trimethylacetaldehyde, 2,2-dimethylpropanal, 2-ethylhexanal and hexahydrobenzaldehyde are especially preferred.

Suitable ketones include acetone, methyl ethyl ketone, methyl propyl ketone, methyl isopropyl ketone, methyl butyl ketone, methyl isobutyl ketone, methyl n-amyl ketone, methyl isoamyl ketone, methyl heptyl ketone, methyl undecyl ketone, diethyl ketone, ethyl butyl ketone, ethyl amyl ketone, diisopropyl ketone, diisobutyl ketone, cyclohexanone, cyclopentanone, methylcyclohexanone, isophorone, methyl tert-butyl ketone, 5-methyl-3-heptanone, 4-heptyl ketone, 1-phenyl-2-propanone, acetophenone, methyl nonyl ketone, dinonyl ketone and 3,3,5-trimethylcyclohexanone. Preferred ketones include cyclopentanone, cyclohexanone, methylcyclopentanone, methylcyclohexanone, 3,3,5-trimethylcyclohexanone, cyclobutanone, methylcyclobutanone, acetone, methyl ethyl ketone and methyl isobutyl ketone.

It is also possible to use mixtures ketones and/or aldehydes in order to obtained specific properties.

The hydroxyamines used in the preparation of the oxazolidines of formula (V) are preferably organic compounds that contain at least one aliphatically bound amino group and at least one aliphatically bound hydroxyl group. The hydroxyamines preferably correspond to formula VI

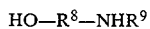 (VI)

Suitable hydroxyamines include bis(2-hydroxyethyl)amine, bis(2-hydroxypropyl)amine, bis(2-hydroxybutyl)amine, bis(3-hydroxypropyl)amine, bis(3-hydroxyhexyl)amine, N-(2-hydroxypropyl)-N-(2-hydroxyethyl)amine, 2-(methylamino)-ethanol, 2-(ethylamino)-ethanol, 2-(propylamino)ethanol, 2-(butylamino)-ethanol, 2-(hexylamino)-ethanol, 2-(cyclohexylamino)-ethanol, 2-amino-2-methyl-1-propanol, 2-aminoethylpropanol, 2-amino-2-propyl-1-propanol, 2-amino-2-methyl-1,3-propanol, 2-amino-3-methyl-3-hydroxybutane, aminoethanol and the isomers of aminopropanol, which may be obtained by the reaction of ammonia with propylene oxide. Bis(2-hydroxyethyl)amine, bis(2-hydroxypropyl)amine, bis(2-hydroxybutyl)amine, bis(3-hydroxyhexyl)amine, 2-(methylamino)-ethanol, 2-(ethylamino)-ethanol, 2-amino-2-methyl-1-propanol and 2- amino-2-ethyl-1-propanol are especially preferred.

The oxazolidines of formula V may be prepared by reacting the starting components such that the hydroxyamines are present in an amount of 1 to 1.5 moles, based on the carbonyl groups of the aldehydes or ketones. Catalytic amounts of acidic substances, such as p-toluenesulphonic acid, hydrogen chloride, sulphuric acid or aluminum chloride, may optionally be used to accelerate the reaction.

The reaction is generally carried out at a temperature of 60° to 180° C. The reaction may optionally be conducted in the presence of an entrainer for removing the water of reaction until the calculated amount of water has been split off or until no more water is split off. The entrainer and any unreacted starting materials that are present are then separated off by distillation. Suitable entrainers include toluene, xylene, cyclohexane and octane. The crude products obtained can be used, without further purification steps, as component b2) in the process according to the invention.

Oxazolidines of higher functionality may be prepared as follows: monooxazolidines corresponding to formula V in the case of which $R^9$ represents hydrogen or contains reactive groups (preferably hydroxyl, primary or secondary amino groups) are modified with at least difunctional reactants. Reactants suitable for the modification operation include polyisocyanates, polyepoxides, polycarboxylic acids, simple polycarboxylic acid esters or polycarboxylic acid anhydrides, and carbonates.

The modification with organic polyisocyanates can be conducted as described in DE-OS 2,446,438. Suitable polyisocyanates are those set forth in the prior publication. Low-molecular-weight (cyclo)aliphatic diisocyanates, such as hexa-methylene diisocyanate, isophorone diisocyanate or 4,4'-diisocyanatodicyclohexylmethane, and higher molecular weight NCO prepolymers prepared from diisocyanates are preferably used.

Polyepoxides suitable for modifying the monofunctional oxazolidines are any desired organic compounds that contain at least two epoxy groups in the molecule. Preferred are aliphatic bisepoxides having epoxy equivalent weights of 43 to 300, such as 1,3-butadiene bisepoxide, 1,5-hexadiene bisepoxide, ethylene glycol diglycidyl ether, glycerol-1,3-diglycidyl ether, 3,4-epoxycyclohexylmethyl-3',4'-epoxycyclohexane carboxylate (Diepoxid 126, Degussa AG) and adipic acid (3,4epoxycyclohexyl) bisester.

The modification reaction between the monooxazolidines and the polyepoxides is generally carried out at a temperature of 70° to 140° C., optionally in the presence of a suitable solvent, such as toluene or cyclohexane.

Oxazolidines of higher functionality may also be prepared by reacting reactive monooxazolidines with polycarboxylic acids, their lower alkyl esters or polycarboxylic acid anhydrides in an esterification reaction (hydroxyl groups in the radical $R^9$), as described in DE-OS 1,952,091 and DE-OS 1,952,092.

The preparation of carbonate group-containing oxazolidines of higher functionality may be carried out in accordance with EP-A-0,499,188 by reacting suitable hydroxy-functional oxazolidines (for example, hydroxyl groups in the radical $R^9$) with carbonates (such as dimethyl, diethyl, dialkyl or diphenyl carbonate) or cyclic carbonates (such as propylene carbonate).

The monooxazolidines having reactive groups and used for the preparation of the oxazolidines of higher functionality can be obtained by using hydroxyamines of the type mentioned above by way of example, which, in addition to the hydroxyl and amine groups necessary for oxazolidine formation, contain other hydroxyl or amine groups that do not participate in oxazolidine formation. Thus, monooxazolidines corresponding to formula V are obtained in which the radical $R^9$ contains hydroxyl groups or reactive amine groups.

To prepare oxazolidines of higher functionality, it is also possible to use monooxazolidines corresponding to formula V in which the radical $R^9$ represents hydrogen, e.g., by using simple amine-alcohols having a hydroxyl group and a primary amine group. The reactivity of such secondary amine groups, which form part of the heterocyclic ring, may be equated to a first approximation with the reactivity of primary or secondary amino groups that may be substituents of the radical $R^9$.

The molecular weight and the functionality of the oxazolidines of higher functionality can be readily adjusted by selecting suitable reactants for the modification of the monooxazolidines.

Bicyclic oxazolidines corresponding to formula III in which the free valencies and the carbon or nitrogen atom linked thereto are part of a fused-on symmetric oxazolidine ring are also very suitable as component b2) according to the invention. Such bicyclic oxazolidines, in which the radicals $R^3$ to $R^7$ and m are as already defined, are prepared in a manner analogous to that used for the preparation of the monocyclic oxazolidines, i.e., by reacting the corresponding aldehydes or ketones with suitable dihydroxyamines, such as 2-amino-2-methyl-1,3-propanediol or 2-amino-2-hydroxymethyl-1,3-propanediol as described, e.g., in U.S. Pat. No. 4,101,527.

Also suitable as component b2), but less preferred, are the bicyclic compounds according to U.S. Pat. No. 4,707,532, 5,089,565 or EP-A-0,346,669.

Optional compounds b3) containing isocyanate-reactive groups are preferably the known organic polyhydroxyl compounds, i.e., both the molecular weight and higher molecular weight polyhydroxyl compounds described for the preparation of the prepolymers and semi-prepolymers, and also aldehyde resins.

Known hydroxy-functional polyacrylates are especially preferred as component b3). These polyacrylates are hydroxyl group-containing copolymers of olefinically unsaturated compounds having a number average molecular weight, determined by measuring vapour pressure or membrane-osmotic pressure of 800 to 50,000, preferably 1,000 to 20,000 and more preferably 5,000 to 10,000, and having a hydroxyl group content of 0.1 to 12% by weight, preferably 1 to 10% by weight and more preferably 2 to 6% by weight. These compounds are copolymers prepared from hydroxyl group-containing olefinic monomers and hydroxyl group-free olefinic monomers.

Examples of suitable monomers are vinyl or vinylidene monomers such as styrene, α-methylstyrene, o- or p-chlorostyrene, o-, m- or p-methylstyrene, p-tert-butylstyrene, acrylic acid, (meth)acrylonitrile, acrylic and methacrylic acid esters having 1 to 8 carbon atoms in the alcohol component (such as ethyl acrylate, methyl acrylate, n- or isopropyl acrylate, n-butyl acrylate, 2-ethylhexyl acrylate, 2-ethylhexyl methacrylate, isooctyl acrylate, methyl methacrylate, ethyl methacrylate, butyl methacrylate and isooctyl methacrylate), diesters of fumaric acid, itaconic acid, maleic acid having from 4 to 8 carbon atoms in the alcohol component, (meth)acrylic acid amide, vinyl esters of alkanemonocarboxylic acids having from 2 to 5 carbon atoms (such as vinyl acetate or vinyl propionate), and hydroxyalkyl esters of acrylic acid or methacrylic acid having from 2 to 4 carbon atoms in the hydroxyalkyl radical (such as 2-hydroxyethyl, 2-hydroxypropyl, 4-hydroxybutyl, trimethylolpropane mono- or pentaerythritol mono-acrylate or-methacrylate). Any desired mixtures of the monomers mentioned by way of example may also be used in the preparation of the hydroxy-functional polyacrylates.

Also suitable, but less preferred, as component b3) or as part of component b3) are the known polyester polyols having a number average molecular weight, which may be determined as described above, of 500 to 10,000 and a hydroxyl group content of 0.6 to 9% by weight.

Any desired mixtures of the polyhydroxyl compounds mentioned by way of example may be used as component b3).

In other respects, the ratios of components a), b1), b2) and b3) in the binding agents used according to the invention are such that the equivalent ratio of isocyanate groups to isocyanate-reactive groups is 0.8:1 to 2:1, preferably 0.8:1 to 1.2:1. When calculating the equivalent ratios, the oxazolidine rings of the monocyclic mono- or poly-oxazolidines are considered to be difunctional for the purpose of the isocyanate addition reaction, and the bicyclic systems are considered to be trifunctional units.

The amount of the component b1) is 1 to 99% by weight, preferably 10 to 75% by weight, and more preferably 20 to 60% by weight.

The amount of component b2) is 1 to 80% by weight, preferably 3 to 60% by weight, and more preferably 5 to 35% by weight.

The amount of optional component b3) is 0 to 98% by weight, preferably up to 75% by weight, and more preferably up to 60% by weight.

All of these amounts indicated are based on the solids content and on the total amount of component b), which is composed of components b1) to b3).

The binding agents to be used according to the invention are prepared by mixing the individual components. When component b3) is used, it can be mixed beforehand with components b1) and b2) in any desired manner. The binding agents may be prepared in the absence or in the presence of the solvents customarily used in polyurethane coating technology.

Solvents that may be used include ethyl acetate, butyl acetate, methoxypropyl acetate, methyl isobutyl ketone, xylene, N-methylpyrrolidone, petroleum, chlorobenzenes, Solvesso solvent and mixtures of such solvents.

The ratio by weight of the total amount of binding agent, i.e., components a) and b), to solvent in the coating compositions to be used in the process according to the invention is generally 40:60 to 100:0, preferably 60:40 to 90:10.

The coating compositions according to the invention may also contain other additives customarily used in coating technology, such as pigments, fillers, flow aids, catalysts, anti-settling agents, and the like.

The properties of the surface coatings obtained in accordance with the invention can be adjusted by a suitable choice of the type and ratios of the starting components a), b1), b2) and b3).

To carry out the process according to the invention, the coating compositions are applied to any desired substrates in one or more layers in known manner, for example, by spraying, coating, immersing or flooding or with the aid of rollers or doctor blades. The process according to the invention is suitable for the production of surface coatings on various substrates, such as metals, plastics, wood or glass. The process according to the invention is especially well suited for the production of surface coatings on sheet steel, such as that used in the manufacture of vehicle bodies, airplanes, panelling, vats or containers. The substrates to be coated may be provided with suitable primer coatings before the process according to the invention is carried out.

After the substrates have been coated, the coatings are cured at a temperature of −20° to approximately 100° C., preferably +10° to +80° C., e.g., by air drying or so-called forced drying. In practice, however, it is of great importance that thermal degradation of the coatings does not occur, even at relatively high temperatures as they may occur when there are operational problems in coating installations.

The surface protection that can be achieved with the coating compositions according to the invention is demonstrated in the following examples, in which all parts and percentages are percentages by weight unless otherwise indicated.

EXAMPLES

The following starting materials are used in the examples.
Polyisocyanates a)
Polyisocyanate I A commercial isocyanurate group-containing polyisocyanate obtained by the trimerization of hexamethylene diisocyanate. NCO content: 22.5%, viscosity: approximately 1,000 mPa.s (23° C.).
Polyisocyanate II A commercial uretdione group-containing polyisocyanate obtained by the dimerization of hexamethylene diisocyanate. NCO content: 22.5%, viscosity: approximately 200 mPa.s (23° C.).
Polyisocyanate III A commercial isocyanurate group-containing polyisocyanate obtained by the trimerization of hexamethylene diisocyanate, 90% solution in butyl acetate/solvent naphtha 100 (1:1), NCO content of the solution: 19.4%, viscosity of the solution: approximately 700 mPa.s (23° C.).
Polyisocyanate IV A commercial biuret polyisocyanate prepared from hexamethylene diisocyanate, 75% solution in methoxy propyl acetate/xylene (1:1). NCO content of the solution: 16.5%, viscosity of the solution: approximately 225 mPa.s (23° C.).
Polyaspartic acid esters b1).
Polyaspartic acid ester I A commercial polyaspartic acid ester obtained by adding 1 mole of 3,3'-dimethyl-4,4'-diaminodicyclohexylmethane to 2 moles of maleic acid diethyl ester, 90% solution in butyl acetate. Equivalent weight of the solution: approximately 325 g/NH, viscosity of the solution: approximately 130 mPa.s (23° C.).
Polyaspartic acid ester II A polyaspartic acid ester obtained from 1 mole of 4,4'-diaminodicyclohexyl-methane and 2 moles of maleic acid diethyl ester (according to EP-A 0,403,921; U.S. Pat. No. 5,126,170). Equivalent weight: approximately 280 g/NH, viscosity: approximately 1,500 mPa.s (23° C.).
Polyaspartic acid ester III A polyaspartic acid ester obtained by adding 1 mole of a mixture of hexahydro-2,4- and -2,6-diaminotoluene (ratio by weight 65:35) to 2 moles of maleic acid diethyl ester (analogously to I and II). Equivalent weight: approximately 265 g/NH, viscosity: approximately 300 mPa.s (23° C.).
Polyaspartic acid ester IV A polyaspartic acid ester obtained from 1 mole of 1-amino-3,3,5-trimethyl-5-aminomethylcyclohexane (IPDA) and 2 moles of maleic acid diethyl ester (according to EP-A 0,403,921; U.S. Pat. No. 5,126,170). Equivalent weight: approximately 263 g/NH, viscosity: approximately 500 mPa.s (23° C.).
Oxazolidines b2)
Oxazolidine I A commercial bisoxazolidine, prepared by reacting 2 moles of N-(2-hydroxyethyl)-isopropyloxazolidine (from 1 mole of diethanolamine and 1 mole of isobutyraldehyde) with 1 mole of adipic acid dimethyl ester.
Oxazolidine II N-(2-hydroxyethyl)-2-ethyl-2-methyloxazolidine prepared from 1 mole of diethanolamine and 1 mole of butanone.
Oxazolidine III A commercial bisoxazolidine prepared by reacting 2 moles of N-(2-hydroxyethyl)-isopropyloxazolidine with 1 mole of hexamethylene diisocyanate.
Oxazolidine IV A commercial bisoxazolidine prepared by reacting 2 moles of N-(2-hydroxyethyl)-2-[1-ethylpentyl]oxazolidine with 1 mole of hexamethylene diisocyanate.
Polyol component b3)
Polyol I A 70% solution in butyl acetate of a copolymer having a hydroxyl group content, based on solids, of 4.1% and containing
- 34.00% of hydroxypropyl methacrylate[1]
- 20.00% of n-butyl acrylate
- 28.00% of methyl methacrylate
- 13.00% of styrene
- 1.00% of acrylic acid
- 4.00% of a commercial initiator[2]

Polyol II

A 70% solution in butyl acetate of a copolymer having a hydroxyl group content, based on solids, of 4.1% and containing:
- 34.00% of hydroxypropyl methacrylate[1]
- 20.00% of n-butyl acrylate
- 28.00% of methyl methacrylate
- 12.00% of styrene
- 2.00% of acrylic acid
- 4.00% of a commercial initiator[2]

Polyol III

A 70% solution in butyl acetate of a copolymer having a hydroxyl group content, based on solids, of 3.1% and containing:
- 43.55% of styrene
- 26.61% of n-butyl acrylate
- 22.00% of hydroxypropyl methacrylate [1]

1.92% of methyl methacrylate
1.92% of acrylic acid
4.00% of a commercial initiator[2]

Polyol IV

A 70% solution in butyl acetate of a copolymer having a hydroxyl group content, based on solids, of 4.2% and containing:
38.64% of styrene
32.40% of hydroxyethyl methacrylate
24.00% of butyl acetate
0.96% of acrylic acid
4.00% of a commercial initiator[2]

[1] mixture of isomers, obtained by the addition of propylene oxide to methacrylic acid
[2] Trigonox B, manufacturer: Akzo Chemie Ready-for-use coating compositions were produced using the preceding starting materials and applied at a dry film thickness of approximately 45 μm to glass plates using a doctor blade. Details regarding the composition of the coating compositions and regarding the mechanical properties of the resulting are set forth in the following Table. Amounts of the starting materials are parts by weight.

Notes:
1) Byk 331, manufactured by Byk
2) Tinuvin 1130, manufactured by Ciba-Geigy AG
3) Tinuvin 292, manufactured by Ciba-Geigy AG
4) Dabco 33LV, available from Air Products
5) Equivalent ratio of isocyanate groups to the sum of free groups and groups potentially reactive towards isocyanate groups
6) methoxypropyl acetate
7) n-butyl acetate
8) DIN 53 211
9) the test consists in the 1- or 5-minute action of a petroleum-soaked cotton wool pad on the coating surface (0=film unchanged, 5=film destroyed)

| | Ex. 1 | Ex. 2 (Comp. to Ex. 1) | Ex. 3 | Ex. 4 (Comp. to Ex. 3) | Ex. 5 | Ex. 6 | Ex. 7 | Ex. 8 |
|---|---|---|---|---|---|---|---|---|
| polyaspartic acid ester b1) | III 250 | III 41.4 | I 26.3 | I 28.2 | I 20.4 | I 20.4 | I 17.6 | I 17.6 |
| oxazolidine b2) | I 9.7 | — | I 4.2 | — | II 7.4 | II 7.4 | I 7.9 | I 7.9 |
| polyol b3) | — | — | I 22.6 | I 24.2 | IV 21.0 | IV 21.0 | I 22.6 | II 22.6 |
| flow agent (50% in BuAc)[1] | 0.4 | 0.5 | 0.3 | 0.3 | 0.3 | 0.3 | — | — |
| light stabilizer (50% in BuAc)[2] | 1.6 | 1.4 | 1.3 | 1.3 | 1.2 | 1.2 | — | — |
| light stabilizer (50% in BuAc)[3] | 1.6 | 1.4 | 1.3 | 1.3 | 1.2 | 1.2 | — | — |
| PU catalyst (10% in BuAc)[4] | — | — | — | — | — | — | — | — |
| polyisocyanate | III 41.9 | III 34.6 | I 11.1 | I 11.9 | I 16.0 | I 32.0 | IV 43.5 | IV 43.5 |
| polyisocyanate | — | — | II 11.1 | II 11.9 | II 16.0 | — | — | — |
| equivalent ratio[5] | 1.0 | 1.0 | 0.8 | 1.0 | 1.0 | 1.0 | 1.0 | 1.0 |
| MPA[6]/xylene/BuAc[7] 1/1/1 | 18.5 | 19.1 | 20.5 | 19.6 | 15.3 | 15.3 | 8.4 | 8.4 |
| solids content (% by weight) | 75 | 75 | 68 | 68 | 70 | 70 | 68 | 68 |
| run out time(s)[8] | | | | | | | | |
| after 0 min. | 18 | 19 | 17 | 18 | 25 | 27 | 21 | 21 |
| after 30 min. | 38 | 58 | 20 | 23 | 32 | 41 | 24 | 26 |
| after 60 min. | | | 24 | 27 | | | 30 | 33 |
| after 90 min. | | | 29 | 32 | | | | |
| petroleum resistance[9] | | | | | | | | |
| after 1d RT 1'/5' | 0/0 | 5/5 | 0/1 | 5/5 | 0/0 | 0/0 | 0/1 | 0/0 |
| 2d RT 1'/5' | 0/0 | ⅔ | | | | | 0/0 | 0/0 |
| 3d RT 1'/5' | 0/0 | 0/1 | | | | | | |
| after 60'60° C. + 2 h RT 1'/5' | | | ⅔ | 5/5 | 0/0 | 0/0-1 | 0/1 | 0/0 |
| +1d RT 1'/5' | | | 1/1 | 4/5 | | | 0/0 | 0/0 |
| 2d RT 1'/5' | | | 0/1 | | | | | |
| drying DIN 53 150 T₁ (h) | 4.5 | 1.5 | 2.5 | 3.0 | 2.25 | 1.75 | 1.5–2 | 1.5–2 |
| T₃ (h) | >10 | 7.0 | 8.0 | >10 | 7.0 | 5.5 | >10 | 7.5 |

| | Ex. 9 | Ex. 10 | Ex. 11 | Ex. 12 | Ex. 13 | Ex. 14 | Ex. 15 (Comp. to Ex. 14) | Ex. 16 | Ex. 17 (Comp. to Ex. 16) |
|---|---|---|---|---|---|---|---|---|---|
| polyaspartic acid ester b1) | I 16.5 | I 19.2 | I 22.2 | II 33.9 | II 33.2 | IV 0.7 | — | IV 0.7 | — |
| oxazolidine b2) | I 7.4 | I 5.8 | I 4.0 | III 6.3 | IV 7.6 | I 0.7 | — | I 0.7 | — |
| polyol b3) | III 21.2 | III 22.0 | III 22.8 | — | — | IV 44.8 | IV 47.9 | I 44.8 | I 47.9 |
| flow agent (50% in BuAc)[1] | 0.4 | 0.4 | 0.4 | 0.4 | 0.4 | 0.3 | 0.3 | 0.3 | 0.3 |
| light stabilizer (50% in BuAc)[2] | 2.6 | 2.6 | 2.6 | 2.9 | 2.9 | 1.9 | 1.9 | 1.9 | 1.9 |
| light stabilizer (50% in BuAc)[3] | 1.3 | 1.3 | 1.3 | 1.5 | 1.5 | 1.0 | 1.0 | 1.0 | 1.0 |
| PU catalyst | — | — | — | — | — | 1.4 | 1.4 | 1.4 | 1.4 |
| polyisocyanate | III 32.0 | III 30.4 | III 28.7 | I 32.4 | I 31.8 | I 15.5 | I 14.8 | I 15.5 | I 14.8 |
| polyisocyanate | — | — | — | — | — | — | — | — | — |
| equivalent ratio[5] | 1.0 | 1.0 | 1.0 | 1.0 | 1.0 | 1.0 | 1.0 | 1.0 | 1.0 |
| MPA[6]/xylene/BuAc[7] 1/1/1 | 18.6 | 18.3 | 18.0 | 22.6 | 22.6 | 33.7 | 32.7 | 33.7 | 3.27 |
| solids content (% by weight) | 68 | 68 | 68 | 75 | 75 | 50 | 50 | 50 | 50 |
| run out time(s)[8] | | | | | | | | | |
| after 0 min. | 22 | 22 | 23 | 19 | 20 | 16 | 16 | 16 | 16 |
| after 30 min. | 27 | 32 | 37 | >50 | >50 | 17 | 16 | 17 | 16 |

| -continued | | | | | | | | | |
|---|---|---|---|---|---|---|---|---|---|
| after 60 min. | 31 | 38 | 45 | | | 18 | 17 | 18 | 16 |
| after 90 min. | | | | | | 19 | 17 | 19 | 16 |
| petroleum resistance[4] | | | | | | | | | |
| after 1d RT 1'/5' | 0/1 | 0/1 | 0/1 | 0/0 | 0/0 | 0/0 | 1/1 | 2/4 | 2/4 |
| 2d RT 1'/5' | 0/0 | 0/0 | 0/0 | | | 0/0 | 0/0 | 0/0 | 0/1 |
| 3d RT 1'/5' | | | | | | | | | |
| after 60'60° C. + 2H RT 1'/5' | | | | 0/0 | 0/0 | 0/1 | ½ | ½ | 4/5 |
| +1d RT 1'/5' | 0/0 | 0/0 | 0/0 | | | 0/0 | 0/1 | 0/1 | 1/1 |
| 2d RT 1'/5' | | | | | | 0/0 | 0/0 | 0/0 | 0/0 |
| drying DIN 53 150 $T_1$ (h) | 1–1.5 | 1–1.5 | 1.0 | 0.5 | 0.5 | 1.25 | 1.5 | 1.75 | 2.25 |
| $T_3$ (h) | 5.0 | 5.0 | 5.0 | 1.5 | 1.5 | 8–10 | 10 | >10 | >10 |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A coating composition in which the binder is a two-component system comprising
   a) a polyisocyanate component and
   b) an isocyanate-reactive component containing a mixture of
   b1) a compound corresponding to formula I

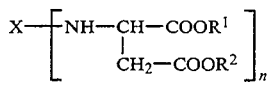

(I)

b2) a compound having a number average molecular weight of 73 to 10,000 and containing at least one structural unit per molecule corresponding to formula II

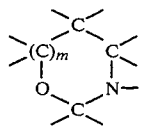

(II)

and
   b3) optionally other compounds containing isocyanate-reactive groups,
wherein
   X represents an n-valent radical which is inert towards isocyanate groups and is obtained by removing the primary amino groups from a polyamine having (cyclo)aliphatically bound amino groups and a molecular weight of 60 to 6,000,
   $R^1$ and $R^2$ may be the same or different and represent alkyl radicals having 1 to 18 carbon atoms,
   n is an integer of at least 2, and
   m is 0 or 1.

2. The coating composition of claim 1 wherein component b2) comprises a compound having a number average molecular weight of 73 to 3,000 and containing 1 to 3 structural units corresponding to formula III per molecule

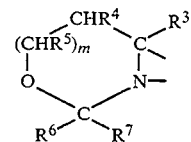

(III)

wherein
   $R^3$ represents hydrogen or an alkyl radical having 1 to 6 carbon atoms,
   $R^4$ and $R^5$ may be the same or different and represent hydrogen or alkyl radicals having 1 to 3 carbon atoms,
   $R^6$ and $R^7$ may be the same or different and represent hydrogen or inert organic radicals, provided that a maximum of one of the radicals $R^6$ and $R^7$ represents hydrogen; or radicals $R^6$ and $R^7$, together with the carbon atom of the heterocyclic ring, may also form a 5- or 6-membered cycloaliphatic ring, and
   m represents 0 or 1.

3. The coating composition of claim 1 wherein component b2) comprises a compound having a number average molecular weight of 73 to 1,500 and contains 1 to 3 structural units corresponding to formula IV per molecule

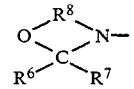

(IV)

wherein
   $R^6$ and $R^7$ may be the same or different and represent hydrogen or inert organic radicals, provided that a maximum of one of the radicals $R^6$ and $R^7$ represents hydrogen; or radicals $R^6$ and $R^7$, together with the carbon atom of the heterocyclic ring, may also form a 5- or 6-membered cycloaliphatic ring, and
   $R^8$ represents an alkylene radical having 2 to 6 carbon atoms, provided that 2 or 3 carbon atoms are arranged between the oxygen atom and the nitrogen atom.

4. The coating composition of claim 1 wherein X represents the radical obtained by removing the amino groups from 1-amino-3,3,5-trimethyl-5-aminomethylcyclohexane, 4,4'-diaminodicyclohexylmethane, 3,3'-dimethyl-4,4'-diamino-dicyclohexylmethane, hexahydro-2,4- and/or -2,6-diaminotoluene, isomers of monomethyl-diaminodicyclohexylmethane or 3(4)-aminomethyl-1-methylcyclohexylamine.

5. The coating composition of claim 2 wherein X represents the radical obtained by removing the amino groups from 1-amino-3,3,5-trimethyl-5-aminomethylcyclohexane, 4,4'-diaminodicyclohexylmethane, 3,3'-dimethyl-4,4'-diamino-dicyclohexylmethane, hexahydro-2,4- and/or -2,6-diaminotoluene, isomers of monomethyl-diaminodicyclohexylmethane or 3(4)-aminomethyl-1-methylcyclohexylamine.

6. The coating composition of claim 3 wherein X represents the radical obtained by removing the amino groups from 1-amino-3,3,5-trimethyl-5-aminomethylcyclohexane, 4,4'-diaminodicyclohexylmethane, 3,3'-dimethyl-4,4'-diamino-dicyclohexylmethane, hexahydro-2,4- and/or -2,6-diaminotoluene, isomers of monomethyl-diaminodicyclohexylmethane or 3(4)-aminomethyl-1-methylcyclohexylamine.

7. The coating composition of claim 1 wherein $R^1$ and $R^2$ represent a methyl, ethyl, n-butyl or 2-ethylhexyl group.

8. The coating composition of claim 2 wherein $R^1$ and $R^2$ represent a methyl, ethyl, n-butyl or 2-ethylhexyl group.

9. The coating composition of claim 3 wherein $R^1$ and $R^2$ represent a methyl, ethyl, n-butyl or 2-ethylhexyl group.

10. The coating composition of claim 1 wherein component b3) is present and comprises a copolymer having a number average molecular weight of 800 to 50,000 and a hydroxyl group content of 0.1 to 12% by weight and prepared from hydroxylalkyl esters of acrylic acid and/or methacrylic acid and other olefinically unsaturated monomers.

11. The coating composition of claim 1 wherein the amount of component b1) is 1 to 99% by weight, the amount of component b2) is 1 to 80% by weight and the amount of component b3) is 0 to 98% by weight, wherein said percentages are based on the total weight of component b).

12. The coating composition of claim 1 wherein components a) and b) are present in quantities sufficient to provide an equivalent ratio of isocyanate groups of component a) to isocyanate-reactive groups of component b) of 0.8:1 to 2:1.

13. A process for the production of a surface coating which comprises coating a substrate with a coating composition in which the binder is a two-component system comprising a) a polyisocyanate component and
b) an isocyanate-reactive component containing a mixture of
b1) a compound corresponding to formula I

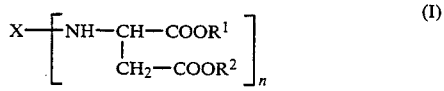

(I)

b2) a compound having a number average molecular weight of 73 to 10,000 and containing at least one structural unit per molecule corresponding to formula II

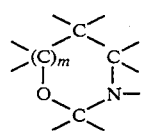

(II)

and b3) optionally other compounds containing isocyanate-reactive groups, wherein X represents an n-valent radical which is inert towards isocyanate groups and is obtained by removing the primary amino groups from a polyamine having (cyclo)aliphatically bound amino groups and a molecular weight of 60 to 6,000, $R^1$ and $R^2$ may be the same or different and represent alkyl radicals having 1 to 18 carbon atoms, n is an integer of at least 2, and m is 0 or 1.

14. The process of claim 13 wherein component b2) comprises a compound having a number average molecular weight of 73 to 3,000 and containing 1 to 3 structural units corresponding to formula III per molecule

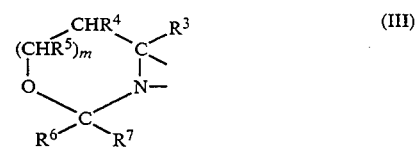

(III)

wherein $R^3$ represents hydrogen or an alkyl radical having 1 to 6 carbon atoms, $R^4$ and $R^5$ may be the same of different and represent hydrogen or alkyl radicals having 1 to 3 carbon atoms, $R^6$ and $R^7$ may be the same or different and represent hydrogen or inert organic radicals, provided that a maximum of one of the radicals $R^6$ and $R^7$ represents hydrogen; or radicals $R^6$ and $R^7$, together with the carbon atom of the heterocyclic ring, may also form a 5- or 6-membered cycloaliphatic ring, and m represents 0 or 1.

15. The process of claim 13 wherein component b2) comprises a compound having a number average molecular weight of 73 to 1,500 and contains 1 to 3 structural units corresponding to formula IV per molecule

(IV)

wherein $R^6$ and $R^7$ may be the same or different and represent hydrogen or inert organic radicals, provided that a maximum of one of the radicals $R^6$ and $R^7$ represents hydrogen; or radicals $R^6$ and $R^7$, together with the carbon atom of the heterocyclic ring, may also form a 5- or 6-membered cycloaliphatic ring, and $R^8$ represents an alkylene radical having 2 to 6 carbon atoms, provided that 2 or 3 carbon atoms are arranged between the oxygen atom and the nitrogen atom.

16. The process of claim 13 wherein X represents the radical obtained by removing the amino groups from 1-amino-3,3,5-trimethyl-5-aminomethylcyclohexane, 4,4'-diaminodicyclohexylmethane, 3,3'-dimethyl-4,4'-diamino-dicyclohexylmethane, hexahydro-2,4- and/or -2,6-diaminotoluene, isomers of monomethyldiaminodicyclohexylmethane or 3(4)-aminomethyl-1-methylcyclohexylamine.

17. The process of claim 13 wherein $R^1$ and $R^2$ represent a methyl, ethyl, n-butyl or 2-ethylhexyl group.

18. The process of claim 14 wherein X represents the radical obtained by removing the amino groups from 1-amino-3,3,5-trimethyl-5-aminomethylcyclohexane, 4,4'-diaminodicyclohexylmethane, 3,3'-dimethyl-4,4'-diamino-dicyclohexylmethane, hexahydro-2,4- and/or -2,6-diaminotoluene, isomers of monomethyl-diaminodicyclohexylmethane or 3(4)-aminomethyl-1-methylcyclohexylamine.

19. The process of claim 13 wherein component b3) is present and comprises a copolymer having a number average molecular weight of 800 to 50,000 and a hydroxyl group content of 0.1 to 12% by weight and prepared from hydroxylalkyl esters of acrylic acid and/or methacrylic acid and other olefinically unsaturated monomers.

20. The process of claim 13 wherein the amount of component b1) is 1 to 99% by weight, the amount of component b2) is 1 to 80% by weight and the amount of component b3) is 0 to 98% by weight, wherein said percentages are based on the total weight of component b).

21. The process of claim 13 wherein components a) and b) are present in quantities sufficient to provide an equivalent ratio of isocyanate groups of component a) to isocyanate-reactive groups of component b) of 0.8:1 to 2:1.

* * * * *